United States Patent
van der Sluis et al.

(10) Patent No.: US 10,349,619 B2
(45) Date of Patent: Jul. 16, 2019

(54) CLEANING DEVICE FOR CLEANING TEATS OF AN ANIMAL FOR MILKING, MILKING MACHINE PROVIDED THEREWITH AND METHOD THEREFOR

(71) Applicants: ROTEC ENGINEERING B.V., Emmeloord (NL); Peter Willem van der Sluis, IJsselmuiden (NL); Raymond Roger Berghuis, Almere (NL); Henk Hofman, Lemmer (NL)

(72) Inventors: Peter Willem van der Sluis, IJsselmuiden (NL); Raymond Roger Berghuis, Almere (NL); Henk Hofman, Lemmer (NL)

(73) Assignee: Technologies Holdings Corp., Houston, TX (US)

( * ) Notice: Subject to any disclaimer, the term of this patent is extended or adjusted under 35 U.S.C. 154(b) by 672 days.

(21) Appl. No.: 15/100,220

(22) PCT Filed: Jul. 21, 2014

(86) PCT No.: PCT/NL2014/050495
§ 371 (c)(1),
(2) Date: May 27, 2016

(87) PCT Pub. No.: WO2015/009158
PCT Pub. Date: Jan. 22, 2015

(65) Prior Publication Data
US 2016/0309674 A1    Oct. 27, 2016

(30) Foreign Application Priority Data
Jul. 19, 2013 (NL) ..................................... 2011202

(51) Int. Cl.
*A01J 5/017* (2006.01)
*A01J 7/04* (2006.01)
(Continued)

(52) U.S. Cl.
CPC .................. *A01J 7/04* (2013.01); *A01J 5/017* (2013.01); *A46B 9/026* (2013.01); *A46B 9/028* (2013.01); *B60S 3/06* (2013.01)

(58) Field of Classification Search
CPC ................. A01J 5/007; A01J 7/04; B60S 3/06
See application file for complete search history.

(56) References Cited

U.S. PATENT DOCUMENTS 1,853,996 A * 4/1932 Putzel .................. A23G 7/0006
15/3.16
4,754,521 A * 7/1988 Zoni ....................... E01H 1/042
15/340.1
(Continued)

FOREIGN PATENT DOCUMENTS

DE      127384 A1   9/1977
WO    9842182 A1  10/1998
WO    9905904 A1   2/1999

OTHER PUBLICATIONS

European Patent Office, Communication pursuant to Article 94(3) EPC, Application No. 14 781 305.9-1655, dated Dec. 21, 2017.
(Continued)

*Primary Examiner* — Michael D Jennings
(74) *Attorney, Agent, or Firm* — Baker Botts L.L.P.

(57) ABSTRACT

The present invention relates to a cleaning device (4) for cleaning and pretreating teats of an animal for milking, milking machine (2) provided therewith and method therefor. The cleaning device according to the invention comprises:
  a frame (52) provided with an arm (6);
  a cleaning head arranged on the arm and provided with a rotatable holder (12) on which one or more rotatable cleaning elements (14) are provided; and
(Continued)

moving means (48, 50, 56) connected to the frame for displacing the cleaning head relative to the teats such that the teats are cleanable using the cleaning elements.

10 Claims, 4 Drawing Sheets

(51) Int. Cl.
*B60S 3/06* (2006.01)
*A46B 9/02* (2006.01)

(56) References Cited

U.S. PATENT DOCUMENTS

| | | | | |
|---|---|---|---|---|
| 5,784,994 | A * | 7/1998 | van der Lely | A01J 5/0175 119/14.08 |
| 6,148,766 | A * | 11/2000 | van der Lely | A01J 5/017 119/14.01 |
| 6,279,507 | B1 * | 8/2001 | van der Lely | A01J 5/0175 119/14.01 |
| 7,752,698 | B2 * | 7/2010 | Morin | B60S 3/063 15/53.1 |
| 7,861,347 | B2 * | 1/2011 | McKeown | A46B 13/001 15/21.1 |
| 8,316,496 | B2 * | 11/2012 | Al-Qaffas | A46B 9/045 15/22.1 |
| 2005/0102779 | A1 * | 5/2005 | Flora | A01D 51/002 15/87 |
| 2007/0174980 | A1 * | 8/2007 | Prevost | E01H 1/053 15/50.1 |
| 2011/0067194 | A1 * | 3/2011 | Al-Qaffas | A46B 9/045 15/167.2 |

OTHER PUBLICATIONS

Canadian Intellectual Property Office, Office Action for Application No. 2,932,311, 4 pages, dated Oct. 3, 2016.
Canadian Intellectual Property Office, Office Action for Application No. 2,932,311, 4 pages, dated Jun. 15, 2016.
World Intellectual Property Organization, International Search Report issued for Int'l Patent Appl'n No. PCT/NL2014/050495, dated Dec. 5, 2014.
World Intellectual Property Organization, Written Opinion issued for Int'l Patent Appl'n No. PCT/NL2014/050495, dated Dec. 5, 2014.

* cited by examiner

CLEANING DEVICE FOR CLEANING TEATS OF AN ANIMAL FOR MILKING, MILKING MACHINE PROVIDED THEREWITH AND METHOD THEREFOR

PRIORITY

This application is a U.S. National Stage Patent Application under 37 U.S.C. § 371 of International Patent Application No. PCT/NL2014/050495, filed Jul. 21, 2014, which claims the benefit and priority of Patent Application No. 2011202, filed in the Netherlands on Jul. 19, 2013, the entire contents of each of which are hereby incorporated by reference in their entirety.

The present invention relates to a cleaning device for cleaning teats of an animal for milking. Such animals for milking are for instance cows and goats.

Milking machines are known in practice and usually make use of manual cleaning of the teats. This takes place for instance for the purpose of combatting mastitis and generating hormones such as oxytocin for milk release. Further known in practice are automated milking systems, for instance so-called milking robots, wherein use is made of brushes to clean teats. It has been found that the cleaning is hereby not carried out optimally. Such cleaning is however of great importance to udder health and milk quality. A poor pretreatment during milking results in a poor milk release and poor milk quality, as expressed for instance in the cell count, and in a poorer condition of the animal for milking.

The present invention has for its object to obviate or at least reduce the above stated problems during cleaning and pretreatment of teats of the animal for milking.

The present invention provides for this purpose a cleaning device for cleaning and pretreating teats of the animal for milking, wherein the cleaning device comprises:
  a frame provided with an arm;
  a cleaning head arranged on the arm and provided with a rotatable holder on which one or more rotatable cleaning elements are provided; and
  moving means connected to the frame for displacing the cleaning head relative to the teats such that the teats are cleanable using the cleaning elements.

Providing an arm on which a cleaning head is arranged enables the cleaning head to be positioned relative to the teats of the animal for milking, for instance a dairy cow. Providing a rotatable holder, for instance in the form of a rotating disc or, in a currently preferred embodiment, in the form of a rotating sub-arm, achieves that the cleaning elements are rotatable relative to the arm, and therefore clean a larger surface area. The cleaning elements rotate here relative to the rotatable holder such that additional cleaning movements are made.

In a currently recommended preferred embodiment a cleaning element rotates about a shaft oriented substantially vertically during use. This achieves that particularly the teats of the animal for milking and the immediate vicinity thereof are cleaned very thoroughly. The cleaning elements are particularly formed by a cleaning brush. It has been found that when such a brush is used and rotated about a preferably substantially vertically oriented shaft, dirt particles are flung outward as a result of a kind of centrifugal effect. It has been found that a cleaning can hereby be realized.

The moving means provide a movement of the arm relative to the animal for milking, particularly in the direction of the teats thereof, both in a horizontal plane and preferably also in a vertical plane, by moving the cleaning elements upward to some extent immediately prior to activation of the rotating cleaning actions. Using the moving means the cleaning head can be displaced relative to the teats and precisely positioned relative thereto such that the teats are cleanable by movement of the cleaning elements. A maximum freedom is hereby realized in positioning of the cleaning elements relative to the teats.

The moving means comprise the mechanism and drive for moving the arm, and in addition the drive for rotating the rotatable holder and the brushes. Provided in a currently preferred embodiment is a single drive with which the diverse movements, both translation and rotation, can be performed. The driving preferably takes place electrically or hydraulically or pneumatically. The drive is optionally safeguarded such that the drive as it were "slips" when it encounters too great a resistance, and no damage is caused to teats and/or fingers which have moved between the cleaning elements and/or to other parts of the animal for milking and/or components of the milking installation or cleaning device, and so on. Safe operation of the cleaning device according to the present invention is hereby provided.

The teats of the animal for milking are thoroughly cleaned using the cleaning movements, which enhances overall udder health. In addition, the chance of infections being transmitted via the milking installation from an animal for milking which is not completely healthy to another animal is reduced and substantially wholly avoided by using the cleaning device according to the invention.

An additional advantage of the use of the cleaning device according to the present invention in a milking installation is that the milk release is hereby also stimulated. Use of the cleaning elements according to the invention therefore further improves the milk release.

In a currently preferred embodiment the rotatable holder is provided for rotation around a shaft on or close to an outer end of the arm. The holder, preferably a sub-arm or propeller-type holder, is preferably provided on an outer end of an arm in order to thereby simplify the positioning of the holder relative to the teats for cleaning. The arm is positioned here relative to the teats from the side of the animal for milking or between the hind legs of the animal for milking. The rotatable holder is driven by a drive which is preferably accommodated in the frame. This drive is preferably suitable for driving the rotatable holder, the cleaning elements arranged for rotation relative to the rotatable holder, and optionally for the whole or partial movements of the arm on which the holder is arranged. An effective and efficient cleaning device is hereby provided.

In an advantageous preferred embodiment according to the present invention the arm comprises a second cleaning head arranged thereon.

Providing a second cleaning head makes it possible to further increase the effectiveness of the cleaning device. It is thus possible to sanitize a first cleaning head while the other cleaning head remains ready for use or is in fact in use for cleaning of the teats. In a currently preferred embodiment a first cleaning element of a first cleaning head is used to clean teats, and a second cleaning element of a second cleaning head is simultaneously sanitized.

The frame is preferably provided with a rotation shaft for arranging the arm rotatably thereon. Providing a rotation shaft on the one hand enables the arm to be folded away and on the other hand, in a currently preferred embodiment, enables the cleaning head which is in use or ready for use to be exchanged. Such an exchange is for instance an option when the rotation shaft is provided in or close to the centre of the arm such that the arm can for instance rotate through about 90° to for instance about 180° and thereby always has one cleaning head available for sanitization and one cleaning head available for cleaning of the teats. An effective device for cleaning teats of an animal for milking is hereby provided.

In an advantageous preferred embodiment according to the present invention the cleaning device further comprises a sanitizing device for sanitizing the cleaning device.

Providing a sanitizing device achieves that the already used cleaning elements can be cleaned in order to thereby prevent transmission of infections. Udder health is hereby preserved for all animals to be milked with a milking installation. Such a sanitizing device can if desired be provided in a separate housing on or close to the frame of the cleaning device according to the invention and/or can be provided on an arm of the cleaning device. The sanitizing device can be provided here with brushes, wiping belts, sprayers/nozzles for spraying disinfectant, water and/or air, dryers for drying the cleaned elements such as brushes. For the purpose of drying the elements, such as the brushes, the elements can be rotated for a centrifugal effect as an alternative or addition to the action of the dryers.

In an advantageous preferred embodiment according to the present invention the cleaning device comprises a detector for detecting teats.

By providing a detector the position of the udder and/or the teats can be determined such that the arm with the holder and the cleaning elements thereon can then be positioned accurately relative to the teats. Such a detector comprises for instance a camera, infrared sensor, ultrasonic sensor and the like. In a currently preferred embodiment the camera is for instance a 3D camera. In addition to the detector, or as alternative thereto, the cleaning device can make use of animal information which is for instance stored from the central management system for the milking process. The position of the teats relative to the udder can for instance be used here for positioning the cleaning elements relative to the teats such that the accuracy of the positioning is further increased and the cleaning can be performed even more precisely.

In a currently recommended advantageous preferred embodiment according to the present invention the cleaning elements comprise one or more brushes, wherein the brush surface comprises a curved face. In addition to a good cleaning, a good stimulus of the milk release is also realized by providing the cleaning elements in the form of brushes. It has been found that a better cleaning can be realized by providing a curved face on the contact side of the brush. In the context of the present invention a curved face is also understood to mean an inclining and/or conical face. The curved face can for instance also be given a spherical or other shape. A recess for the teats for cleaning can for instance be provided in the centre of such a brush. It has further been found that such a cleaning element can be cleaned in effective manner by making use of a centrifugal action, wherein dirt particles are flung out of the element by rapid rotation. This sanitizing of the cleaning elements can be combined if desired with the use of spray nozzles with which water and/or cleaning liquid is supplied and/or counter-brushes for a type of mechanical cleaning.

The brushes are preferably provided with bristles of differing lengths. Bristles can thus be given a relatively great length, a medium length or a short length. More variation in the length is expressly possible. The average length of the bristles is for instance about 130 mm.

The bristles are for instance of a polyester material, although other materials or combinations thereof are likewise possible.

In a currently recommended preferred embodiment at least two brushes are provided on the holder which preferably rotate in opposite directions. This further enhances the effect of the cleaning.

In a further recommended preferred embodiment according to the present invention the cleaning device further comprises displacing means for co-displacing the cleaning device with a rotatable milking installation.

Having the cleaning device co-displace through a determined distance or angular displacement particularly makes it possible to also apply the cleaning device according to the invention in a so-called rotary milking parlour, of both the inner milking apparatus and outer milking apparatus types. It is noted that the cleaning device can also be applied to for instance a fixed cubicle application.

The invention further also relates to a milking machine provided with a cleaning device as described above and/or a method for cleaning teats of an animal for milking, the method comprising the steps of:
 providing a cleaning device as described above;
 positioning the cleaning elements relative to the teats; and
 cleaning the teats.

Such a milking machine and/or method provides the same effects and advantages as described for the cleaning device.

The method preferably also comprises of sanitizing the cleaning elements. Sanitizing the cleaning elements during operation of the cleaning device provides for an effective cleaning wherein udder health is optimally preserved, and for an efficient cleaning wherein the cleaning elements of a first set are sanitized while a second set of cleaning elements is preferably ready for use for the purpose of cleaning a subsequent animal for milking. Sanitizing of a first set of cleaning elements is preferably performed here while a second set of cleaning elements is in use or is ready for use.

In a currently recommended preferred embodiment an udder of the animal for milking is detected in a first detecting step using a camera. The arm is then moved to the udder using the moving means. During or after this movement of the arm in the direction of the udder the position of the teats is determined (even) more accurately using a detector in a second detecting step, after which the arm is moved further toward the teat. Performing the step of detecting the teats in two sub-steps particularly enables the position of the udder as a whole to be determined in a first detecting step, while the specific position of the teat is further determined in the second step. The positioning of the cleaning elements relative to the teat can hereby be performed in effective manner.

In a currently preferred embodiment the arm is moved between the hind legs of the animal for milking and toward the teat. It has been found that the cleaning elements can hereby be moved toward the teats in the manner which is most comfortable for the animal for milking. The arm is moved here in length direction toward the teats, i.e. substantially parallel to the movement of the arm, wherein the arm extends substantially parallel to this direction of movement. During positioning of the arm between the hind legs of the animal for milking the holder is preferably positioned such that, in the case of an embodiment provided with a sub-arm, the holder extends substantially in line with the arm. The least amount of space is hereby necessary in breadthwise direction, and the hind legs will not be able to come into contact with the cleaning device, or will only do so to minimal extent.

Further advantages, features and details of the invention are elucidated on the basis of preferred embodiments thereof, wherein reference is made to the accompanying drawings, in which.

Figure 1:
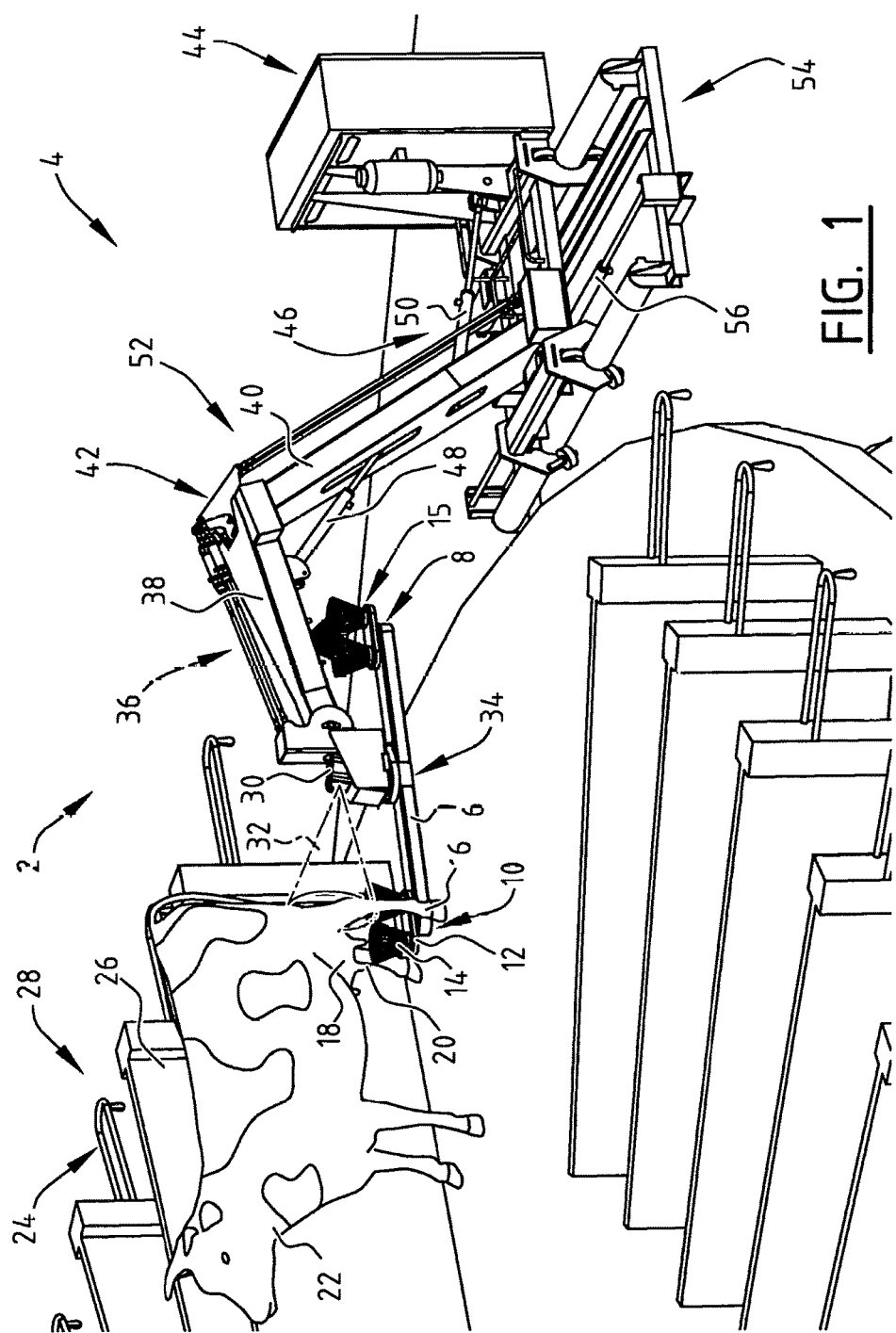
FIG. 1 shows a view of a milking installation provided with a cleaning device according to the invention.
Figure 2:
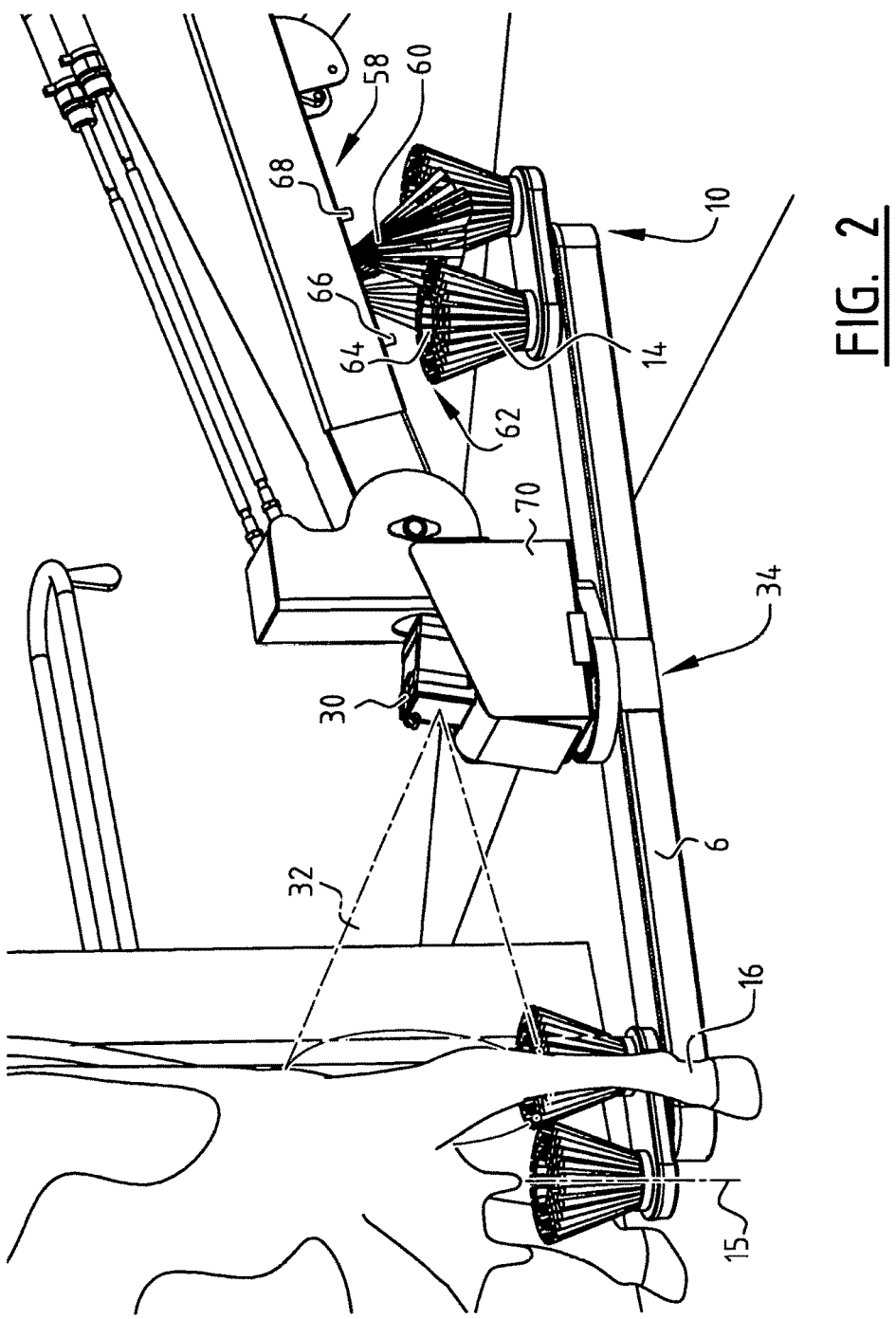
FIG. 2 shows a detail of the device of FIG. 1.

A milking installation 2 (FIGS. 1 and 2) is provided with a cleaner 4. Cleaner 4 comprises an arm 6 which is provided in the shown embodiment at both outer ends 8 with a rotation shaft 10 about which a sub-arm 12 is rotatably arranged. In the shown embodiment sub-arm 12 is further provided with a brush 14 on each outer end of sub-arm 12, wherein brush 14 is rotatable around brush axis 15. In the shown embodiment arm 6 is carried through between hind legs 16 to udder 18 provided with teats 20 of an animal for milking 22. In the shown embodiment the animal for milking 22 is a dairy cow which is placed at animal position 24. Individual animal positions 24 are separated by partition walls 26 of rotary milking parlour 28 of the outer milking apparatus type. It will be apparent that cleaning device 4 can also be applied to other types of milking installation 2.

Arm 6 is connected in the shown embodiment to camera 30, whereby udder 18 and teats 20 are detectable in measuring range 32. In the shown embodiment camera 30 is a 3D camera. It will be apparent that other types of camera and detector, including infrared and ultrasonic detectors, and combinations thereof are additionally or alternatively possible.

Arm 6 is rotatable around rotation shaft 34 relative to moving mechanism 36. Mechanism 36 comprises first arm 38 and second arm 40. Arms 38, 40 are mutually connected via a rotation shaft 42 and connected to base station 44 via rotation shaft 46. The movements of arms 38, 40 are realized using a number of cylinders 48, 50. Frame 52 of cleaning device 4 is further provided with displacing mechanism 54, wherein a translating movement can be performed using cylinder 56. In the shown embodiment cleaning device 4 can co-displace with the rotating movement of rotary milking parlour 28 using displacing mechanism 54.

Sanitizing device 58 (FIG. 2) is provided in the shown embodiment with a number of brushes or counter-brushes 60 along which brushes 14 rotate in order to be sanitized. In the shown embodiment upper surface 62 of brush 14 takes an inclining, conical or curved form from a centre 64 of brush 14. Use can be made during cleaning of sprayer 66 for spraying water and/or disinfectant, and of a blower 68 for blowing air or another gas. Blower 68 can additionally be used to dry brushes 14 after sanitizing thereof. Brushes 14 can alternatively or additionally be dried by a rapid, optionally even accelerated rotation.

The rotation speed of the brushes relative to the holder amounts to for instance about 100-300 rpm, preferably about 200 rpm, while the holder itself rotates at a lower speed, for instance between 50-150 rpm, and preferably about 100 rpm. Brushes 14 preferably rotate at about twice the speed of sub-arm 12. Sanitizing device 58 can if desired be provided with a separate housing. Camera 30 can also be provided with a housing 70 for protection thereof.

Figure 3:
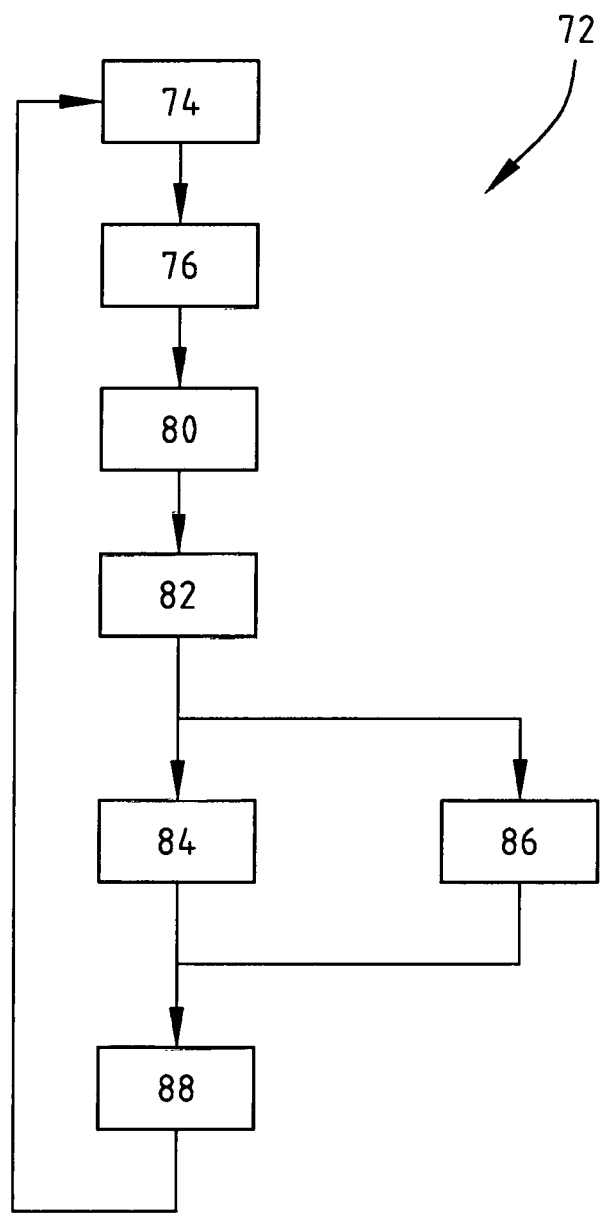
FIG. 3 shows a schematic overview of the operation of the cleaning device according to the invention.

The cleaning process 72 (FIG. 3) begins upon arrival 74 of an animal for milking 22. A position of udder 18 is then determined in first detecting step 76, after which arm 6 is moved, for instance between hind legs 16, in positioning step 78, wherein sub-arm 12 extends substantially in the length direction of arm 6 in order to thereby limit the dimension in width direction. During or after positioning movement 78 second detecting step 80 is performed in order to determine the specific position of teats 20. This is followed by a second positioning step 82 which can optionally be performed in integrated manner with the first positioning step 78. In this second positioning step 82 sub-arm 12 is positioned relative to teats 20 by moving the arm 6 and sub-arm 12 in the horizontal plane followed by a movement, preferably in the vertical plane, i.e. preferably an upward movement, toward teats 20. If desired, the different movements can also be performed simultaneously or in a different order. Cleaning step 84 then takes place and, optionally simultaneously, the step 86 of sanitizing the brushes provided on the other outer end 8 of arm 6. Following completion of cleaning and/or sanitizing process 84, 86 a repositioning step 88 takes place in order to return cleaning device 4 to the starting situation, wherein sub-arm 12 extends substantially in the length direction of arm 6 in order to thereby limit the dimension in width direction, and to then await the arrival 74 of the next animal for milking 22.

Figure 4:
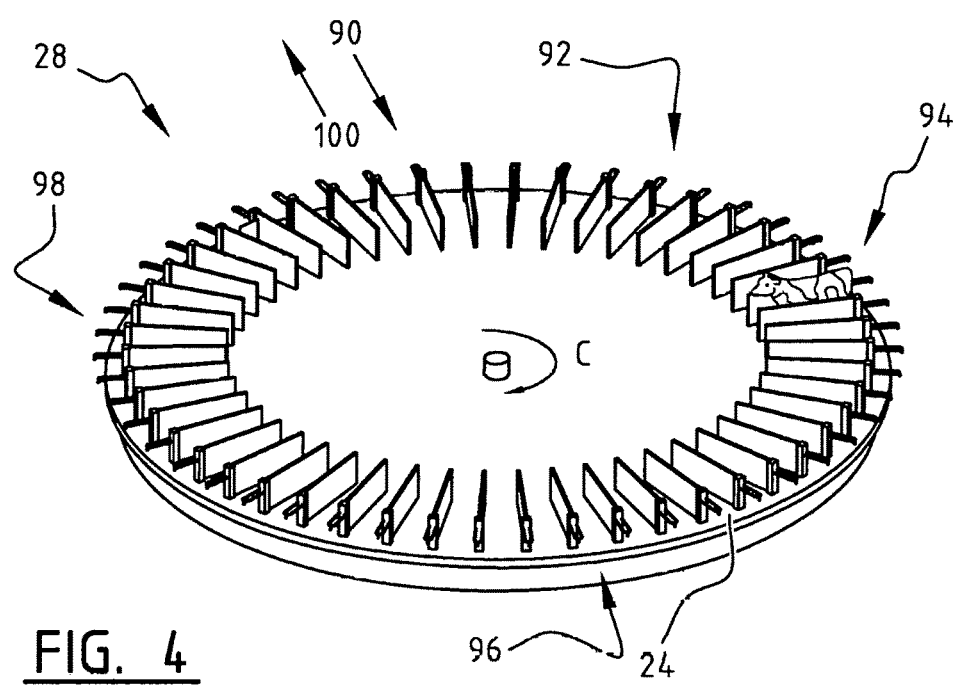
FIG. 4 shows a view of a rotary milking parlour provided with the cleaning device of FIG. 1.

In addition to applying cleaning device 4 in a fixed cubicle application, it can also be applied on a rotary milking parlour. Such a rotary milking parlour 28 (FIG. 4) can be provided as a type of inner milking apparatus or a type of outer milking apparatus and can be provided with device 4. These different types relate to the positioning of the animal for milking relative to the rotary milking parlour. In rotary milking parlour 28 the animal for milking is first moved into one of the cubicles 24 of rotary milking parlour 28 at entrance 90. Following pretreatment 92 teat cups are arranged on teats 20 of udder 18 of the animal for milking 22 at connecting position 94. After teat cups have been arranged the milking begins through rotation part 96, wherein rotary milking parlour 28 rotates in direction C or in the opposite direction. After the milking process has ended, the placed teat cups are removed with a removal system from teats 20 of udder 18 of milked animal 22 during after-treatment 98. The milked animal 22 then steps out of rotary milking parlour 28 at exit 100, after which cubicle 24 is made ready to receive a subsequent animal for milking.

A rotation of rotary milking parlour 28 usually takes about 10 minutes, during which a milk release of about 15-25 liters can be realized in the case of for instance a dairy cow. Reducing the time required for the cleaning, connecting and removal of teat cups makes more time available for the actual milking process. It has been found that with a rotary milking parlour 28 according to the invention more time in this way remains for the actual milking process. The yield is hereby maximized and the calmness of the animal for milking is also increased.

The present invention is by no means limited to the above described embodiments thereof. The rights sought are defined by the following claims, within the scope of which many modifications can be envisaged.

The invention claimed is:

1. A cleaning, comprising:
    an arm having a first end and a second end;
    a first sub-arm coupled to the first end of the arm and operable to rotate about a first rotation shaft;
    a first brush arranged on a first end of the first sub-arm and operable to rotate about a first brush axis;
    a second brush arranged on a second end of the first sub-arm and operable to rotate about a second brush axis; and a detector coupled to the arm and configured to detect teats of a dairy livestock.

2. The cleaning device of claim 1, wherein the first rotation shaft is oriented substantially vertically during use.

3. The cleaning device of claim 1, further comprising:
a second sub-arm coupled to the second end of the arm and operable to rotate about a second rotation shaft.

4. The cleaning device of claim 3, further comprising:
a third brush arranged on a first end of the second sub-arm and operable to rotate about a third brush axis;
a fourth brush arranged on a second end of the second sub-arm and operable to rotate about a fourth brush axis.

5. The cleaning device of claim 4, further comprising a sanitizing device configured to sanitize the first brush and the second brush while the third brush and the fourth brush are in use.

6. The cleaning device of claim 1, wherein the arm rotates about a second rotation shaft.

7. The cleaning device of claim 1, wherein at least the first brush has a surface that comprises a curved face.

8. The cleaning device of claim 7, wherein at least the first brush is provided with bristles of differing lengths.

9. The cleaning device of claim 1, wherein the first brush and the second brush are rotatable in opposite directions.

10. The cleaning device of claim 1, wherein the first and second brushes are configured to rotate at a first speed and the first sub-arm is configured to rotate at a second speed less than the first speed.

\* \* \* \* \*